(12) United States Patent
Chari et al.

(10) Patent No.: US 7,430,163 B2
(45) Date of Patent: Sep. 30, 2008

(54) DATA STREAM TRANSMISSION PREPROCESSING

(75) Inventors: Sujai Chari, San Francisco, CA (US); Rajeev Krishnomoorthy, San Jose, CA (US)

(73) Assignee: Tzero Technologies, Inc., Sunnyvale, CA (US)

( * ) Notice: Subject to any disclaimer, the term of this patent is extended or adjusted under 35 U.S.C. 154(b) by 886 days.

(21) Appl. No.: 10/893,810

(22) Filed: Jul. 19, 2004

(65) Prior Publication Data
US 2006/0013259 A1  Jan. 19, 2006

(51) Int. Cl.
H04J 11/00 (2006.01)
H04J 1/00 (2006.01)
H04B 1/00 (2006.01)
H04K 1/10 (2006.01)

(52) U.S. Cl. .............. 370/208; 370/343; 375/140; 375/146; 375/260

(58) Field of Classification Search .............. None
See application file for complete search history.

(56) References Cited

U.S. PATENT DOCUMENTS

| 6,208,871 | B1 * | 3/2001 | Hall et al. ............ 455/517 |
| 6,301,221 | B1 | 10/2001 | Paterson |
| 6,487,252 | B1 | 11/2002 | Kleider et al. |
| 7,263,133 | B1 * | 8/2007 | Miao ............ 375/267 |
| 7,321,610 | B2 * | 1/2008 | Lu ............ 375/148 |
| 7,324,578 | B2 * | 1/2008 | Kwon et al. ............ 375/135 |
| 2002/0150038 | A1 * | 10/2002 | Sumasu et al. ............ 370/208 |
| 2002/0160719 | A1 * | 10/2002 | Glazko et al. ............ 455/67.4 |
| 2003/0026200 | A1 * | 2/2003 | Fu et al. ............ 370/208 |
| 2003/0133432 | A1 * | 7/2003 | Moerder ............ 370/342 |
| 2003/0198282 | A1 * | 10/2003 | Tujkovic et al. ............ 375/146 |
| 2003/0235147 | A1 * | 12/2003 | Walton et al. ............ 370/204 |
| 2004/0057396 | A1 * | 3/2004 | Hokao ............ 370/320 |
| 2004/0071118 | A1 | 4/2004 | Dabak |
| 2004/0120413 | A1 | 6/2004 | Park et al. |
| 2004/0131007 | A1 | 7/2004 | Smee et al. |
| 2004/0233972 | A1 * | 11/2004 | Karaoguz ............ 375/130 |
| 2007/0116091 | A1 * | 5/2007 | Kakura ............ 375/130 |
| 2008/0019422 | A1 * | 1/2008 | Smith et al. ............ 375/136 |

OTHER PUBLICATIONS

Analysis of Extended OFDM-CDMA, International OFDM Workshop, 2001.

* cited by examiner

Primary Examiner—Kwang B. Yao
Assistant Examiner—Jutai Kao
(74) Attorney, Agent, or Firm—Brian R. Short

(57) ABSTRACT

Embodiments of transmission data stream pre-processing are disclosed. A method includes receiving the data stream for transmission, forming blocks of samples from the data stream, inverse Fourier transforming the blocks of samples forming multi-carrier signal symbols, selecting sets of k multi-carrier signal symbols and time expanding each of the sets of the k multi-carrier signal symbols into sets of n multi-carrier signal symbols, where n is greater than k, and transmitting each of the n multi-carrier signal symbols. The time expansion can be accomplished by coding the coding the sets of k multi-carrier signal symbols.

36 Claims, 15 Drawing Sheets

```
┌─────────────────────────────────────────────┐
│   RECEIVING THE BASE-BAND RECEIVED SIGNALS  │
│                    1410                     │
└─────────────────────┬───────────────────────┘
                      │
┌─────────────────────┴───────────────────────┐
│      FILTERING ADJACENT CHANNEL INTERFERENCE│
│                    1420                     │
└─────────────────────┬───────────────────────┘
                      │
┌─────────────────────┴───────────────────────┐
│  REMOVING THE CYCLIC PREFIX OF THE MULTI-CARRIER│
│                  SIGNALS                    │
│                    1430                     │
└─────────────────────┬───────────────────────┘
                      │
┌─────────────────────┴───────────────────────┐
│    TIME COMPRESSING THE MULTI-CARRIER SIGNALS│
│  THROUGH DECODING CONSISTENT WITH THE CODING│
│  USED TO TIME SPREAD THE MULTI-CARRIER SIGNALS│
│                    1440                     │
└─────────────────────┬───────────────────────┘
                      │
┌─────────────────────┴───────────────────────┐
│  TRANSFORMING THE DECODED MULTI-CARRIER BACK TO│
│           THE FREQUENCY DOMAIN              │
│                    1450                     │
└─────────────────────┬───────────────────────┘
                      │
┌─────────────────────┴───────────────────────┐
│   CONVERTING THE MULTI-CARRIER SYMBOLS INTO A│
│              SERIAL DATA STREAM             │
│                    1460                     │
└─────────────────────────────────────────────┘
```

FIGURE 14

DATA STREAM TRANSMISSION PREPROCESSING

FIELD OF THE INVENTION

The invention relates generally to network communications. More particularly, the invention relates to methods and apparatus for data stream transmission preprocessing.

BACKGROUND OF THE INVENTION

Home networking is evolving into an environment in which people will be sharing photographs, music, video, data and voice among networked consumer electronics, personal computers and mobile devices throughout the home. Consumers will be able to stream video content from a personal computer or electronic device to flat panel high-definition television (HDTV) without the use of wires. A technology that will be implemented for enabling these capabilities is ultra wideband (UWB). UWB is a wireless technology designed for short-range, personal area networks.

The Federal Communications Committee (FCC) has mandated that UWB radio transmission can legally operate in the frequency range of 3.1 GHz to 10.6 GHz, at a transmission power of −41.25 dBm/MHz, having a minimum bandwidth of 500 MHz. Basically, UWB devices provide wide bandwidth transmission at very low signal power levels. Due to the low transmission signal power levels of UWB, transmission interference can be a very big issue. The interference can be from both non-UWB devices, and similar UWB devices.

FIG. 1 shows an example of an indoor broad band wireless communication network 100. The network 100 includes a high definition television (HDTV) monitor 110 networked with other devices, such as, a digital video recorder (DVR) 120, a digital video disk (DVD) player 140 and a computing device 130.

HDTV streaming video requires large bandwidths of information. Therefore, the networking of devices that include streaming HDTV must be capable of handling high bandwidths. Additionally, the devices of the network must be resistance to both self-interference and interference from other wireless communication signals. UWB wireless signals operate at very low power levels, making resistance to interference more difficult.

Personal home networks operating at very high data bandwidths can suffer from multi-path, which can constructively or destructively add to the main (typically, the shortest) transmission path. The multi-path signals are delayed copies of the signal of the main path multiplied by a random phase and amplitude, and cause inter-symbol interference (ISI). That is, an echo of a previously transmitted symbol can interfere with the reception of a present symbol.

To alleviate the effects of ISI, an implementation of UWB includes orthogonal frequency division multiplexing (OFDM) signal transmission. OFDM is a special form of multi-carrier modulation in which multiple user symbols are transmitted in parallel using different sub-carriers. The sub-carriers have overlapping frequency spectra, but their signal waveforms are specifically chosen to be orthogonal. OFDM systems transmit symbols that have substantially longer time durations than the length of the impulse response of the transmission channel, thereby allowing avoidance of ISI. OFDM modulation techniques are very efficient in indoor broad band wireless communication. However, even OFDM signals suffer when in the presence of interfering devices.

It is desirable to have an apparatus and method for a wireless data transmission in which lower power devices can communicate without interference from like devices inhibiting the wireless data transmission, and are resistant to interference from unlike devices as well.

SUMMARY OF THE INVENTION

An embodiment of the invention includes a method of pre-processing a data stream for transmission. The method includes receiving the data stream for transmission, forming blocks of samples from the data stream, inverse Fourier transforming the blocks of samples forming multi-carrier signal symbols, selecting sets of k multi-carrier signal symbols and time expanding each of the sets of the k multi-carrier signal symbols into sets of n multi-carrier signal symbols, where n is greater than k, and transmitting each of the n multi-carrier signal symbols. The time expansion can be accomplished by coding the coding the sets of k Multi-carrier signal symbols.

Additional embodiments can further include frequency expanding the multi-carrier signal symbols, and/or space expanding the multi-carrier signal symbols. Both the frequency expansion and the space expansion can be accomplished by additional coding of the multi-carrier signal symbols.

Another embodiment of the invention also includes a method of pre-processing a data stream for transmission. This method includes receiving the data stream, forming blocks of samples from the data stream, generating coded patterns of each of the blocks of samples, inverse Fourier transforming the blocks of samples forming coded patterns of multi-carrier signal symbols, and transmitting the coded patterns of the multi-carrier signal symbols.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 14 is a flow chart that shows a method of receiving a pre-processed transmission signal.

DETAILED DESCRIPTION

Figure 1:
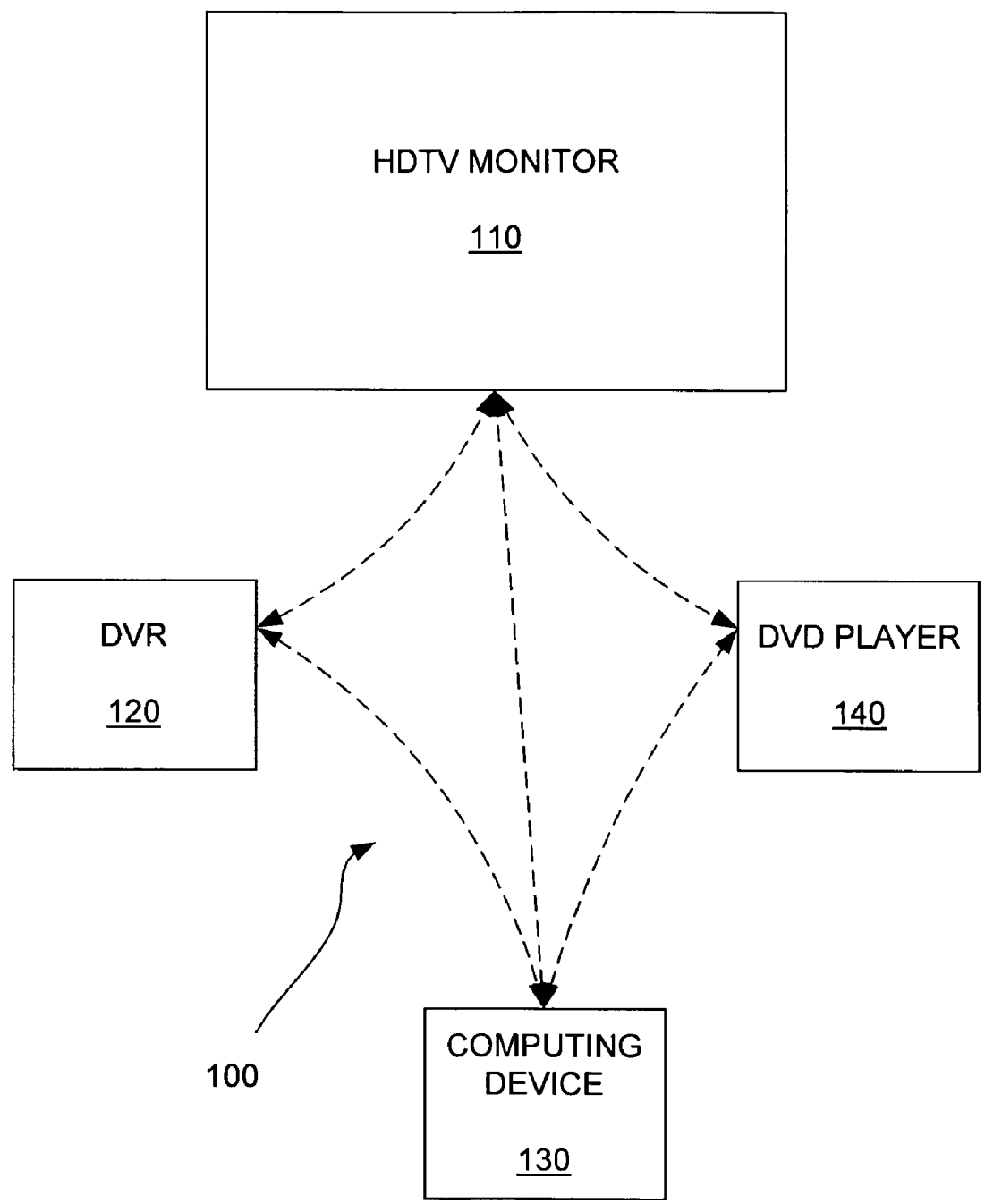
FIG. 1 shows a wireless home network.

As shown in the drawings for purposes of illustration, the invention is embodied in an apparatus and method for pre-processing of low power, high bandwidth transmission signals.

Figure 2:
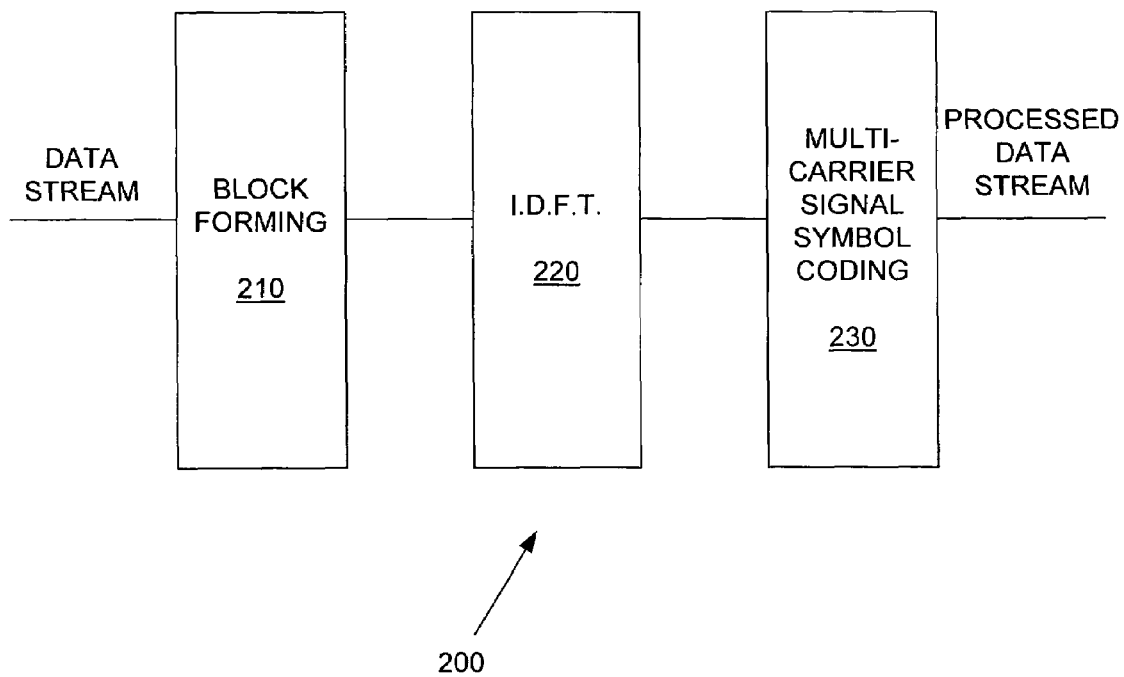
FIG. 2 shows a data stream pre-processor.

FIG. 2 shows a data stream pre-processor 200. The preprocessor 200 receives a digital stream of data bits for wireless transmission within a network. A block former 220 selects blocks of the data bits. An inverse Fourier transform is performed on the blocks by a Inverse Discrete Fourier Transform (DFT) block 220 forming multi-carrier signal symbols. The multi-carrier signal symbols are time spread by a coder 230. An embodiment of the multi-carrier signal symbols includes OFDM symbols.

The block former 220 forms the blocks by selecting blocks of samples from the data stream. The block forming can be implemented with a serial to parallel converter, which receives a single bit stream, and generates a number of parallel constellation signals. The number of constellation signals within each block is generally equal to the number of multi-carriers.

The IDFT block 220 performs an inverse discrete Fourier transform, typically, an Inverse Fast Fourier Transform (IFFT) on the selected blocks. The IFFT converts the blocks from the frequency domain to the time domain.

The coder 230 spreads the multi-carrier signal symbols over time through appropriate coding. The coding spreads k multi-carrier signal symbols over time by expanding the k multi-carrier signal symbols into n symbols, where n is greater than k. As will be described, various self-interfering devices within a network can each include a different code. The amount of spreading (expanding) can be varied depending upon the level of desired error rate. Proper code selection provides for improved transmission by allowing mitigation of self-interference. More specifically, codes can be selected that provide low correlation between the transmission signals, thereby allowing the signals to be more easily separated. Code selections can additionally include optimizing both cross-correlation gain and auto-correlation gain. An embodiment includes k being equal to one, while other embodiments can include k being greater than one.

Figure 3:
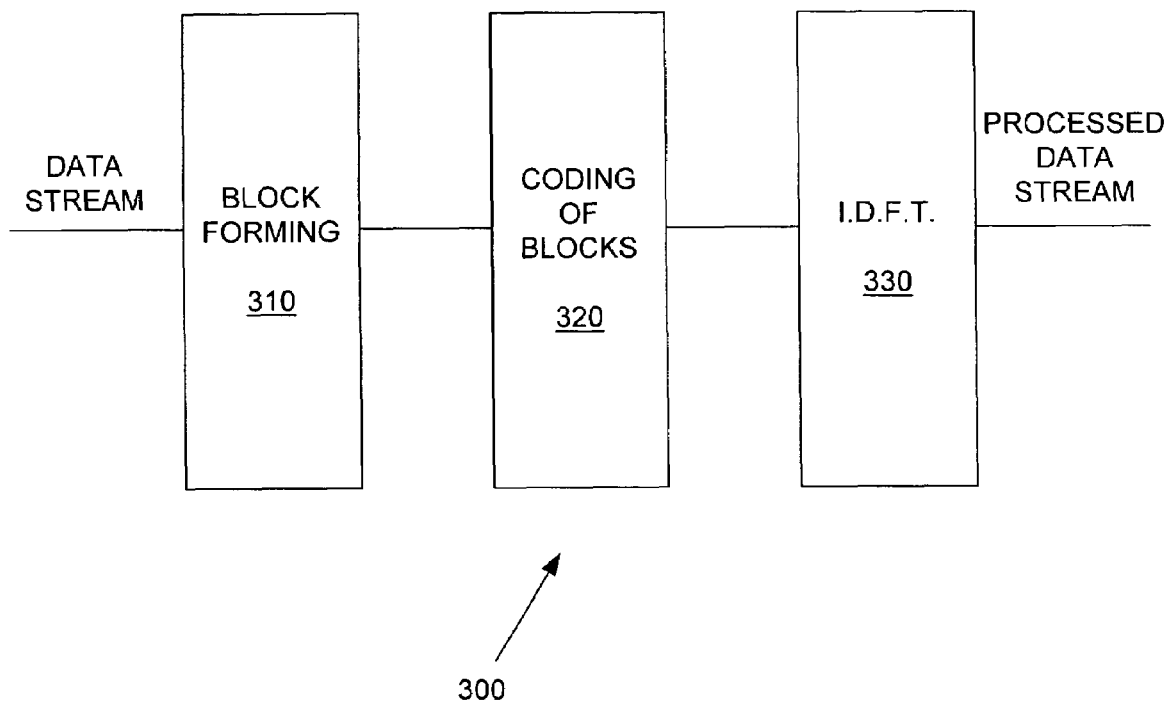
FIG. 3 shows another data stream pre-processor.

FIG. 3 shows another data stream pre-processor 300. The sequence of coding and domain transformation for the pre-processor is different than the sequence of the data stream pre-processor of FIG. 2. The pre-processor includes a block former 310 that is similar to the block former 210 of FIG. 2.

A block coder 320 allows each of the blocks to be individually coded. This is equivalent to each of the carriers within the multi-carrier symbol being individually coded, or time spread. This can be accomplished, for example, by multiplying each of the formed blocks with a corresponding time spreading code.

An IDFT block 330 performs an inverse discrete Fourier transform, typically, an Inverse Fast Fourier Transform (IFFT) on the selected blocks. The IFFT converts the coded blocks from the frequency domain to the time domain. The embodiment of FIG. 3 typically requires more individual IDFTs to be performed than the embodiment of FIG. 2 because an IDFT has to be performed on each of the coded blocks.

The data stream pre-processors 200, 300 of FIGS. 2 and 3 provide time spreading of multi-carrier signal symbols. These implementations are generally more efficient than single carrier signals that are time spread. That is, the spreading of multi-carrier symbols is equivalent to spreading blocks of single carrier symbols. The spreading of multi-carrier symbols as shown in FIGS. 2 and 3 require substantially less hardware than spreading of an equivalent number of blocks of single carrier symbols, and therefore, are more efficient.

Figure 4:
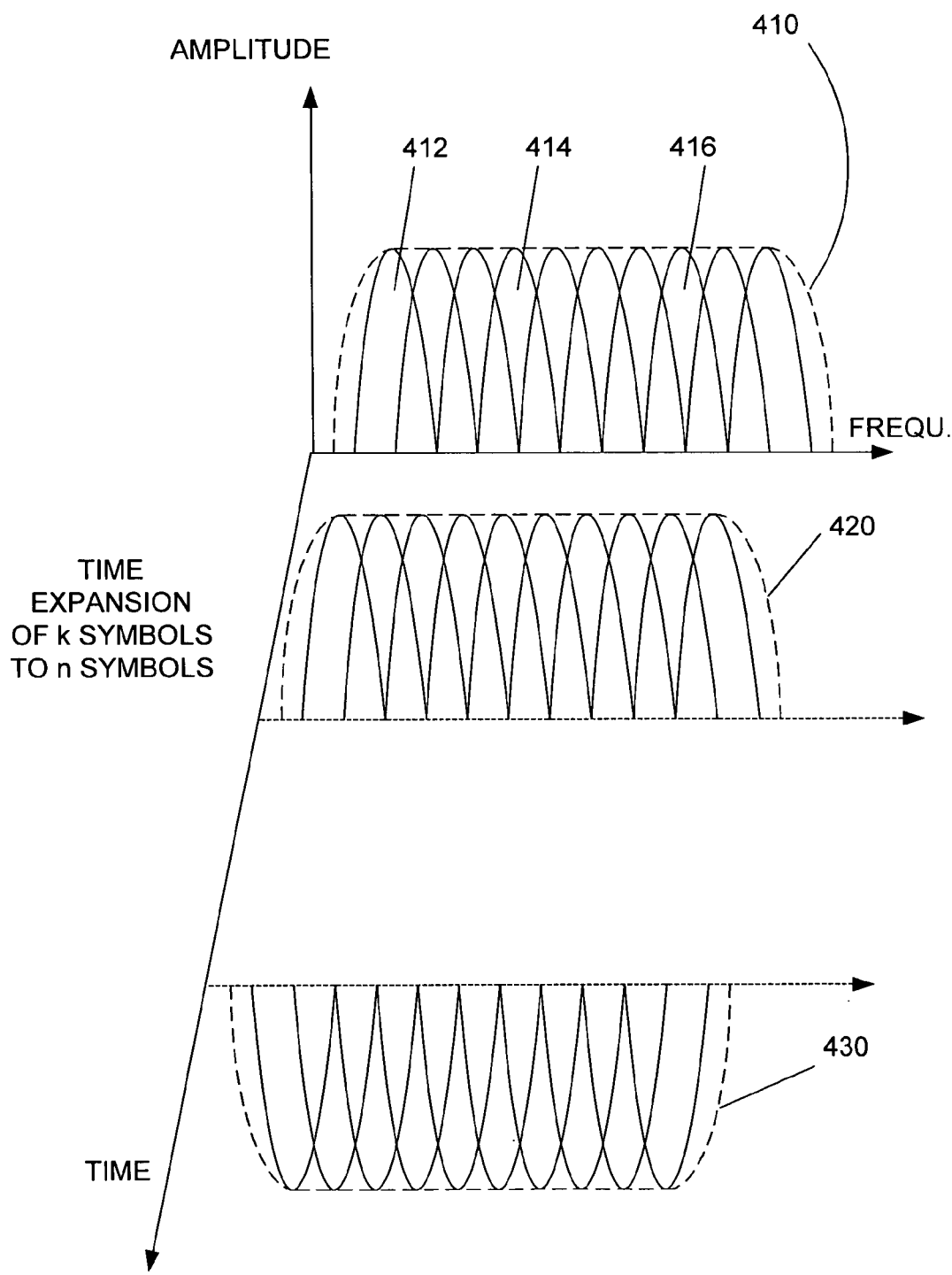
FIG. 4 shows frequency and time lines of multiple multi-carrier signal symbols that can be time expanded by the pre-processor of FIG. 2.

FIG. 4 shows frequency and time lines of multiple multi-carrier signal symbols that can be time expanded by the pre-processors of FIG. 2 and FIG. 3. A first symbol 410 is shown that include multiple tones, for example, tones 412, 414, 416. An embodiment of the first symbol 410 occupies 528 MHz of frequency spectrum, and includes 128 tones, which corresponds to 4.125 MHz/tone. Alternate embodiments include 25 to 100 data tones, and as will be explained later, can be frequency expanded to include more tones. The amplitudes of the tones of the symbol 410 are shown as being the same in amplitude. However, the amplitudes of the tones can vary from tone to tone depending upon the data rate of each sub-carrier.

Other multi-carrier signal symbols 420, 430, can be formed by coding the first multi-carrier signal symbol 410. The coding spreads the first multi-carrier signal symbol over time. As shown in FIG. 4, k equals one, and n equals 3. However, clearly, k can be any number greater than one, and n can be any number greater than k.

If k is greater than one, the selected k multi-carrier signal symbols do not have to be contiguous in time. That is, for example, if k equals two, FIG. 4 can be used to demonstrate that the first symbol 410 and the third symbol 430 can be selected for time expansion.

The symbols can be multiplied by inverted coefficients when expanded. For example, if the first symbol 410 is selected for expansion, the expanded symbols (for example, the second symbol 420 and the third symbol 430) can include positive and negative multipliers. For example, the third symbol 430 can be an inverted representation of the first symbol 410.

The coding used to time expand the selected k multi-carrier signal symbols can include a series of one and negative one multipliers. For example, if as shown in FIG. 4, k equals one and n equals three, the coding can include [1, 1, −1] and results in the three symbols 410, 420, 430. An embodiment of the code includes a Gold code. As will be described later, Gold codes exhibit excellent cross-correlation properties. When multiple communicating devices utilize Gold codes that are highly uncorrelated with each other, reliable communication can be achieved even when the devices are simultaneously transmitting, and therefore, interfering with each other. These are desirable characteristics for environments in which several communicating devices are closely located.

An embodiment of the time expansion circuitry includes inverters that invert at least one of the k multi-carrier symbols while generating the n time spread multi-carrier symbols. Incoming multi-carrier symbols are inverted or not inverted according to a selecting time spreading code. Exemplary codes include Gold or Walsh codes as will be described later.

The receiver of the time spread multi-carrier symbols can de-spread (decode) the received multi-carrier symbols by coherently adding or subtracting the received multi-carrier symbols. An advantage of inversion/non-inversion coding is that no additional memory is required because the coding/decoding is done "on the fly." That is, the coding/decoding doesn't require multi-carrier symbols to be stored during operation. An additional advantage of this configuration is very low latency.

Figure 5:
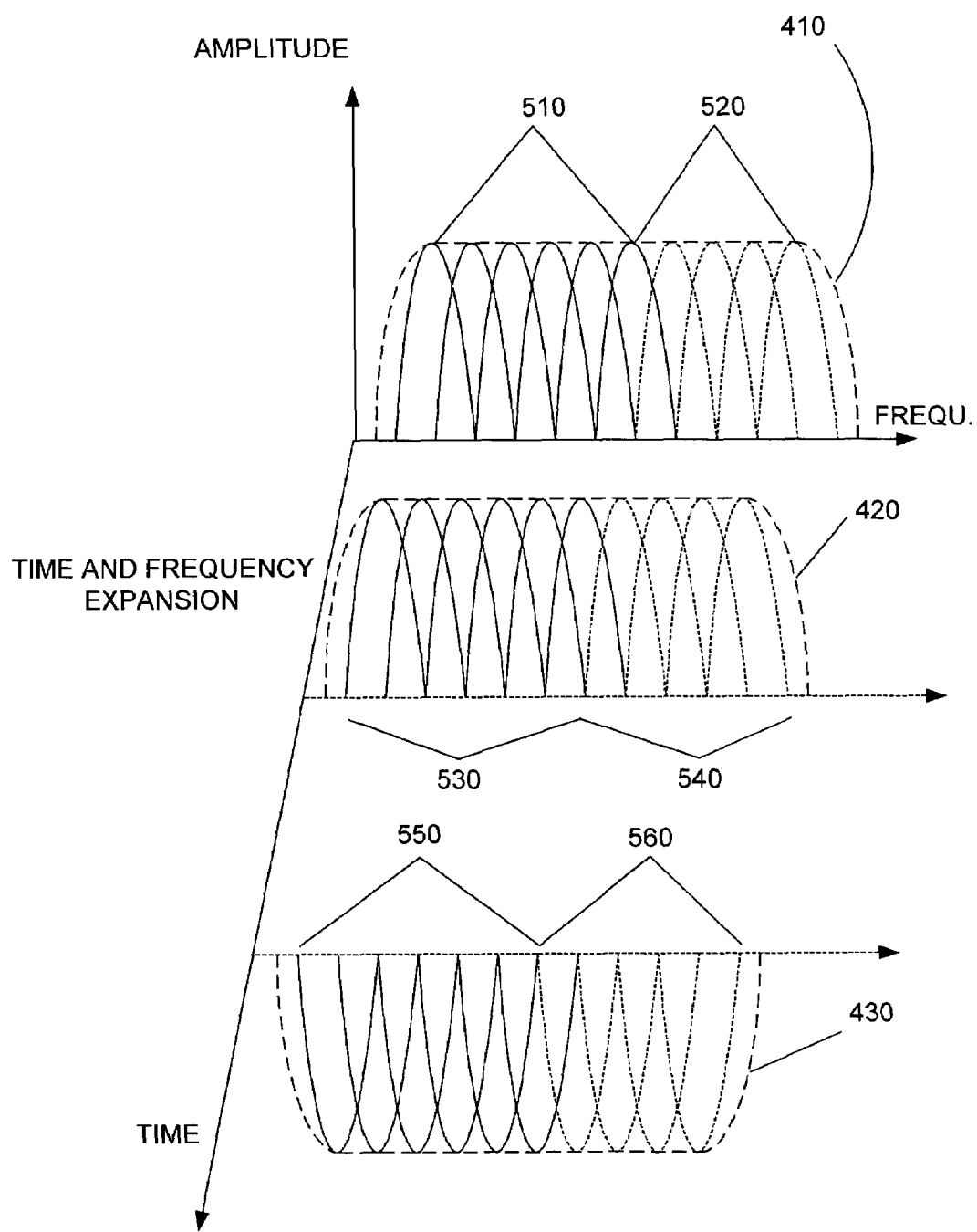
FIG. 5 shows frequency and time lines of multiple multi-carrier signal symbols that can be frequency expanded by the pre-processor of FIG. 2.

FIG. 5 shows frequency and time lines of multiple multi-carrier signal symbols that can be frequency expanded by the pre-processors of FIG. 2 and FIG. 3. The pre-expanded symbols can include an initial number of tones. For example, the first symbol 410 can include an initial set of tones 510. After being frequency expanded, the first symbols 410 can include additional tones 520 due to the frequency expansion.

An embodiment of the symbols includes 128 tones, of which up to 100 of the tones are data. The frequency expansion can expand 25 to 50 data tones up to 100 tones. The coding can include forward error correction. Forward error correction can be desirable because forward error correction corrects errors with a minimal amount of frequency expansion.

FIG. 5 shows that time expanded symbols 420, 430 can also be frequency expanded. For example, an initial set of tones 530, 550 of the second symbol 420 and the third symbol 430 can be expanded to include additional tones 540 and 560. The frequency expansion can be implemented with coder, duplication and convolution circuitry.

Figure 6:
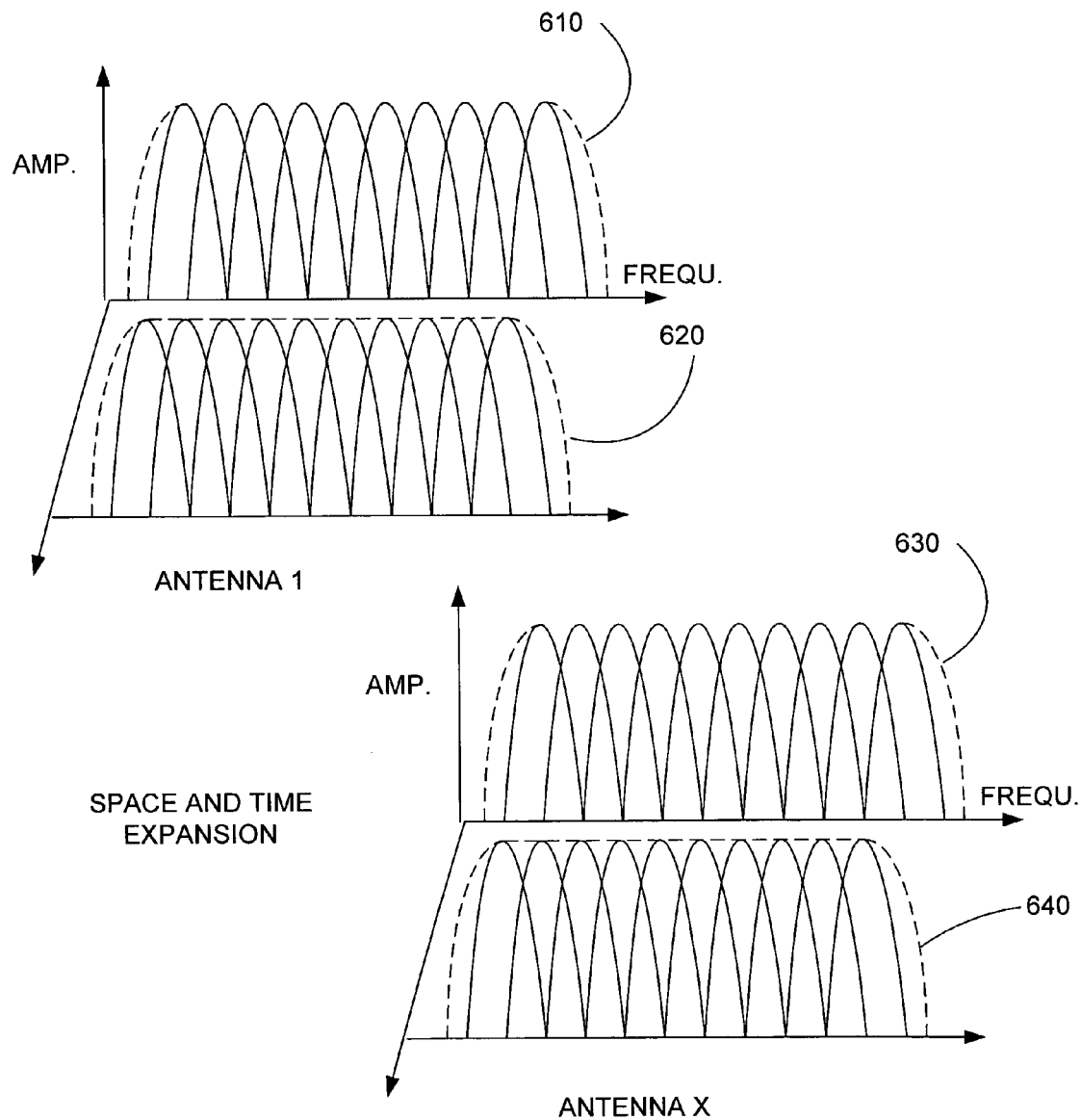
FIG. 6 shows frequency and time lines of multiple multi-carrier signal symbols that can be spatially expanded by the pre-processor of FIG. 2.

FIG. 6 shows frequency and time lines of multiple multi-carrier signal symbols that can be spatially expanded by the pre-processors of FIG. 2 and FIG. 3. Selected time expanded symbols 610, 620 can be coded producing space expanded symbols 630, 640.

The space expanded symbols are transmitted from spatially separate antennas. First symbols 610, 620 can be transmitted from a first antenna, and x expanded symbols can be transmitted from x different antennas. The spatial expansion provides separate streams for each of the spatially separate antennas. An embodiment includes the separate streams being highly uncorrelated with each other.

The spatial expansion or coding includes encoding a steam of symbols to provide separate encoded streams for separate antennas. Each encoded stream is distinct. For example, differential delays can be imposed upon different streams by imposing different phase rotations on the samples of each of the streams, or by spreading each of the streams with a different spreading sequence. The distinctiveness of each encoded stream with respect to the other streams can be a function of the correlation between the streams of each of the other antennas. The more the transmission channels of each of the antennas are uncorrelated with respect to each other, the less distinct the encoding required of each of the signal streams. Feedback can be used to determine the optimal spatial coding.

Spatial multiplexing is a transmission technology that exploits multiple antennas at both transmitter and receiver to increase the bit rate in a wireless radio link with no additional power or bandwidth consumption. Under certain conditions, spatial multiplexing offers a linear increase in spectrum efficiency with the number of antennas. For example, if three antennas are used at the transmitter and the receiver, the stream of possibly coded information symbols is split into three independent sub-streams. These sub-streams occupy the same channel of a multiple access protocol. Possible same channel multiple access protocols include a same time slot in a time-division multiple access protocol, a same frequency slot in frequency-division multiple access protocol, a same code sequence in code-division multiple access protocol. The sub-streams are applied separately to the transmit antennas and transmitted through a radio channel. Due to the presence of various scattering objects in the environment, each signal experiences multi-path propagation.

The composite signals resulting from the transmission are finally captured by an array of receiving antennas with random phase and amplitudes. At the receiver array, a spatial signature of each of the received signals is estimated. Based on the spatial signatures, a signal processing technique is applied to separate the signals, recovering the original sub-streams.

The time-expansion of multi-carrier signals, can easily be expanded to include the time expansion of multiple multi-carrier signal streams in which each of the multi-carrier signal streams is individually time expanded. Spatial multiplexing of the multi-carrier signals can provide greater data rates and reduce the effects of interference, while the time expansion of the multi-carrier signals can reduce the effects of interference.

FIGS. 4, 5 and 6 show time expanded signals, time-frequency expanded signals and time-space expanded signals. However, other embodiments can include combinations of time, frequency and space coding.

Figure 7:
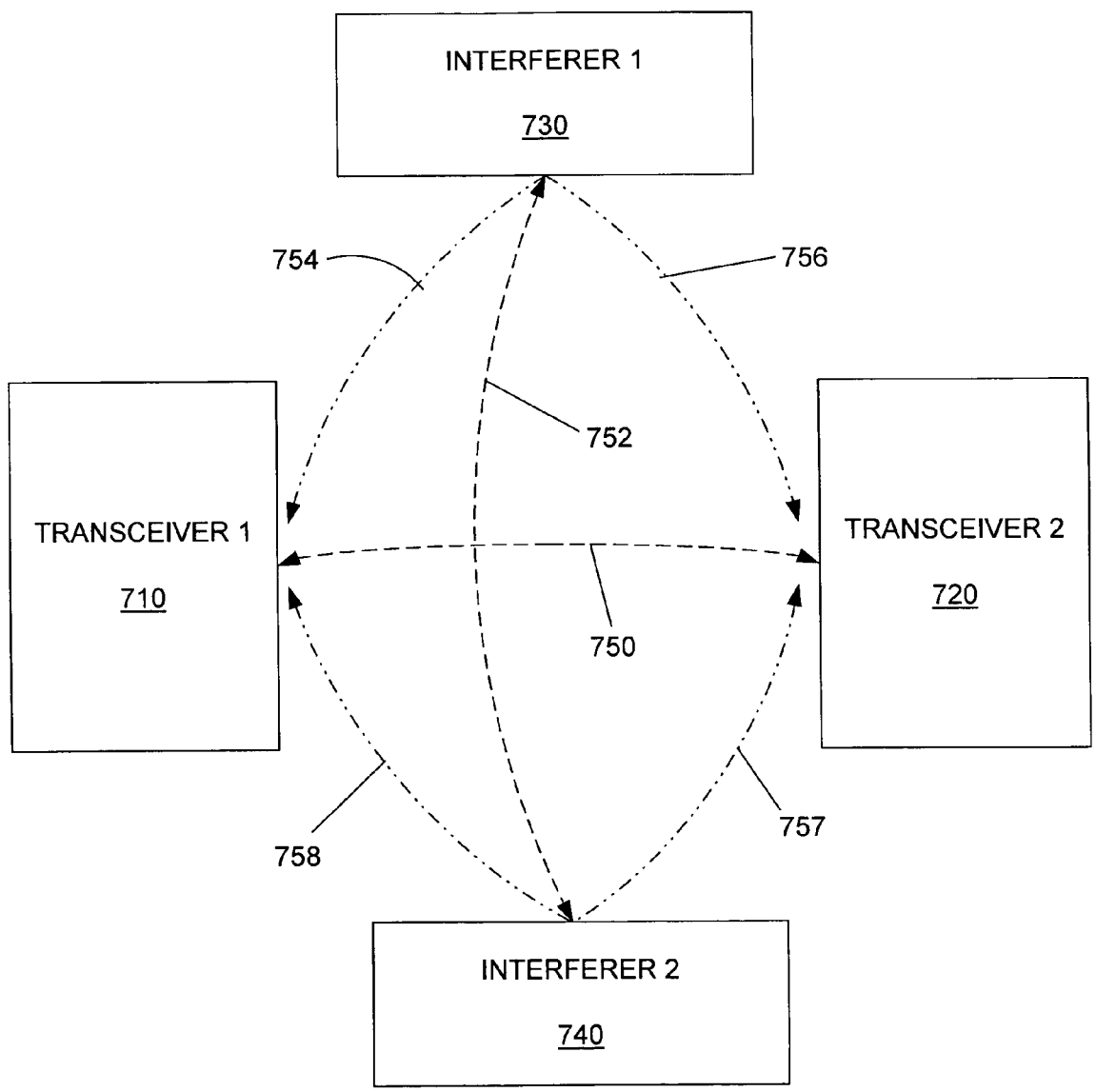
FIG. 7 shows a wireless network that includes a pair of transceivers that are communication, and a pair of interfering devices.

FIG. 7 shows a wireless network that includes a pair of transceivers 710, 720 that are communicating, and a pair of interfering devices 730, 740. A first communication link 750 exists between the pair of transceivers 710, 720. A second link 752 exists between the pair of interfering devices 730, 740. For multiple devices (communicating, for example, over the first link 750 and the second link 752) operating over the same frequency spectrum, interference will result. FIG. 7 shows interfering links 754, 756, 757, 758 from interfering devices 730, 740 to the pair of transceivers 710, 720. For a low-power environment, such as with UWB devices, the time spreading with coding can be used to create transmission signals that are less correlated. That is, if the pair of transceivers 710, 720 include time spreading with a first Gold code, and the interfering devices 730, 740 include time spreading with a second Gold code, the interference of the interfering devices 730, 740 is easier to mitigate.

Figure 8A:
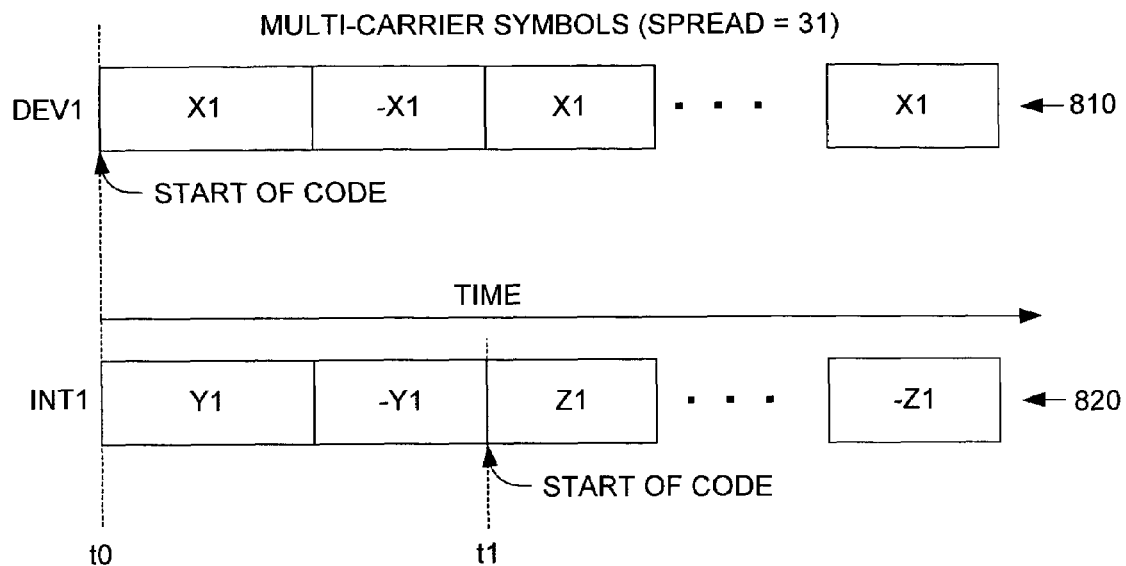
FIGS. 8A and 8B show time lines of multi-carrier signal symbols, transmitted and received by the transceivers and interfering devices of FIG. 7.
Figure 8B:
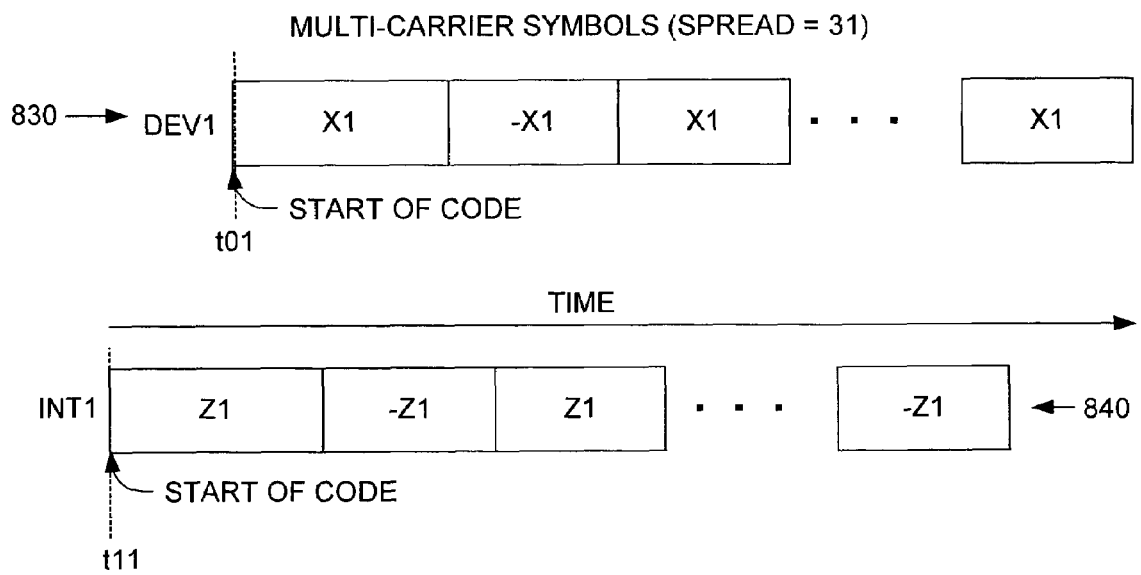

FIGS. 8A and 8B shows multi-carrier symbols of the transceivers and interfering devices of FIG. 7. FIGS. 8A and 8B show possible timing relationships between symbols of the transceivers 710, 720 with respect to the symbols of the interfering devices 730, 740. The timing relationships provide synchronization information that can be used to help select the coding, and the amount of time expansion provided by the coding.

Desired Signal and Undesired Signal Synchronization

FIG. 8A shows a first row 810 of symbols of a multi-carrier signal received from a first device (DEV1), and a second row 820 of symbols of a multi-carrier signal received from an interfering device (INT1). For this description, it is assumed that both the multi-carrier signal of the first device, and the multi-carrier signal of the interfering device have been time spread by coding them with, for example, a Gold code of length 31 (SPREAD).

The first row 810 begins at the start of a transmitted symbol designated as time t0. The starting point of the symbols of the first device can be determined by detecting training information within the symbol. The second row 820 shows the start of the coded interfering symbol at time t1. The starting point of the interfering symbol of the interfering device can be determined by detecting training symbols transmitted by the interferer, for example, when the first device is silent.

The time t1 can be defined as:

$t1 = t0 + m*T + \Delta t$; where t1 is the starting time of the interfering device's coded symbol, t0 is the starting time of the transmitting device's coded symbol, T is the length in time of an un-coded multi-carrier symbol, and m is an integer that provides a representation of the chip offset (defined below).

The ratio Δt/T defines a fractional symbol offset (defined below), where Δt is greater than T.

A first synchronization term generally referred to as the "chip offset", is equal to the difference in time between the starting time of the interfering symbol t1 and the starting time of the first device symbols t0, divided by the length in time of a single multi-carrier signal symbol. If the chip offset is zero, then the symbols of the desired first device, and symbols of the interfering device are perfectly synchronized. As previously stated, the symbol starting times of both the desired first device and the interfering device can be determined by detection of the training information that typically exists within the symbols.

FIG. 8B shows a third row 830 of a coded symbol of the first device, and a fourth row 840 of a coded symbol of the interfering device. The symbols shown in FIG. 8B show the symbols of the two devices "skewed" in time. The symbol of the first device begins at time to1, and the symbol of the interfering device begins at time t11. A term generally referred to as "fractional symbol offset" is defined as the difference between t01 and t11 divided by the divided by the length in time of a single multi-carrier signal symbol.

Figure 9:
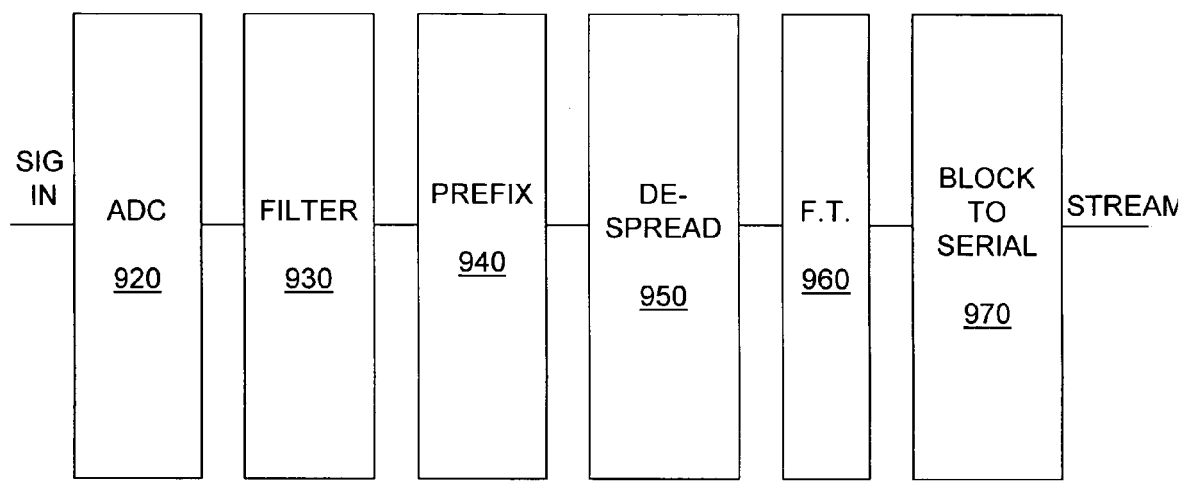
FIG. 9 shows a receiver that includes time de-spreading of time spread multi-carrier signals.

FIG. 9 shows a receiver 910 that includes time de-spreading of time spread multi-carrier signals. The receiver includes an analog to digital converter (ADC) 920, which receives the base-band received signals, and generates digital samples. A filter section 930 removes adjacent channel interference. Prefix removal circuitry 940 removes the cyclic prefix of the multi-carrier signals (note, this could alternatively be a post-fix). De-spreading circuitry 950, time compresses the multi-carrier signals through decoding consistent with the coding used to time spread the multi-carrier signals. A Fourier transform block 960 transforms the decoded multi-carrier back to the frequency domain. A block converter 970 converts the multi-carrier symbols into a serial data stream.

Embodiments of the pre-coding include selecting the Gold codes of the time spreading based upon the chip offset and the fractional symbol offset of the desired symbol and the interfering symbol. This process can be adaptive. That is, the transmission of signals can be adaptively coded depending upon the chip offset and the fractional symbol offset of the desired symbols and the interfering symbols.

The selection of code types and code length can be determined through experimentation and simulation. More specifically, code types and lengths can be tested over the full possible range of chip offsets and fractional offsets. Typically, a code will be selected that provides the greatest average cross-correlation gain across all chip offsets. Therefore, a level of performance can be guaranteed for random chip offsets. An embodiment includes the ability to adjust the chip offset. Once the chip offset has been determined during training, the receiving device can communicate to the transmitting device to adjust the transmission by some multiple of length of the time of an un-coded multi-carrier symbol. The accuracy that the chip offset can be controlled is dependent upon the receiver's ability to measure the current chip offset, the resolution that the transmitter can adjust start times of transmitted symbols, and the consistency over time of the start time of the interfering symbols. The chip offset can then be adjusted to provide the highest possible cross-correlation gain.

Clearly, the coding of proximate devices should be different, thereby allowing them to be more easily distinguishable from each other. Additionally, the coding of proximate devices can be selected so that signals of the proximate device are highly uncorrelated. Making these selections generally requires knowing the coding used by proximate devices. The coding used by proximate devices (interfering transmitters) can be determined by comparing received symbols with known training sequences, and deducing the coding of the interfering transmitters.

Code Lengths

Generally, the greater the length of the coding, the greater the likelihood of providing uncorrelated signals. However, the length of the coding is generally limited by required data rates. That is, the greater the required data rate, the shorter the length of the coding. The coding generally includes a finite number of available lengths. An embodiment includes selecting a length of coding to minimize cross-correlation with interfering transmitters, in which the selection of the length is based upon a set of available lengths.

The lengths of the codes of interferers can influence the selection of codes. That is, the previously described experimentation and simulation can be used to determined which families of codes, and which lengths of codes provide the best cross-correlation gain. For example, first interferer may have a code length of seven, and a second interferer may have a code length of thirty-one. The signal of interest (SOI) will be coded to provide the highest possible cross-correlation gain in the presence of the two different code length interferers. Again, however, the required data rate typically dictates the maximal length of the selected codes.

Time Spreading Using Gold Codes

Time spreading can be used to provide processing gain to improve transmission quality in the presence of SOP interferers. The time spreading of different transmission signals with different codes, can provide transmission signals with higher cross-correlation gains. That is, the coding of the transmission signal make the transmission signals less correlated, and therefore, easier to separate.

Sample codes that can be used for simulation of time spreading, include the following Gold codes:

| Device | Gold Code Sequences (Length = 31) |
|---|---|
| 1 | C1 = {1,1,1,1,1,1,-1,-1,-1,1,-1,-1,-1,1,1, 1,1,-1,-1,-1,1,-1,1,-1,-1,1,1,-1,-1,-1} |
| 2 | C2 = {1,-1,-1,1,-1,-1,-1,-1,1,-1,-1,-1,-1, -1,1,-1,1,1,1,-1,1,-1,-1,1,1,1,-1,-1, 1,-1,-1} |

The cross correlation gain for each chip offset can be express below for the situation in which the fractional symbol offset between the desired symbols and the interfering symbols is zero.

More specifically, the cross correlation gain (CCG) can be given as:

$$CCG = \left(\left|\sum_k C_1(k)C_1(k)\right|^2 \Big/ \left|\sum_k C_1(k)C_{i,\Delta}(k)\right|^2 + \right.$$

$$\left.\left|\sum_k C_1(k)C_1(k)\right|^2 \Big/ \left|\sum_k C_1(k)C^*_{i,\Delta}(k)\right|^2\right) \Big/ 2$$

$$= \left(N^2 \Big/ \left|\sum_k C_1(k)C_{2,\Delta}(k)\right|^2 + N^2 \Big/ \left|\sum_k C_1(k)C^*_{2,\Delta}(k)\right|^2\right) \Big/ 2$$

Where
N=31 (length of the sequence),
$C_1(k)$=the Gold code for device 1 (k=0 . . . N−1),
$C_1(k)$=the Gold code for device 2 (k=0 . . . N−1), Δ=Chip offset, $C_{i,\Delta}(k)=C_i(k+\Delta)$ for k=0 ... (N−1−Δ)

$C_i(N-1-k)$ for k=(N−Δ ... N−1)

$C^*_{i,\Delta}(k)=C_i(k+\Delta)$ for k=0 ... (N−1−Δ)

$-C_i(N-1-k)$ for k=(N−Δ ... N−1).

Figure 10:
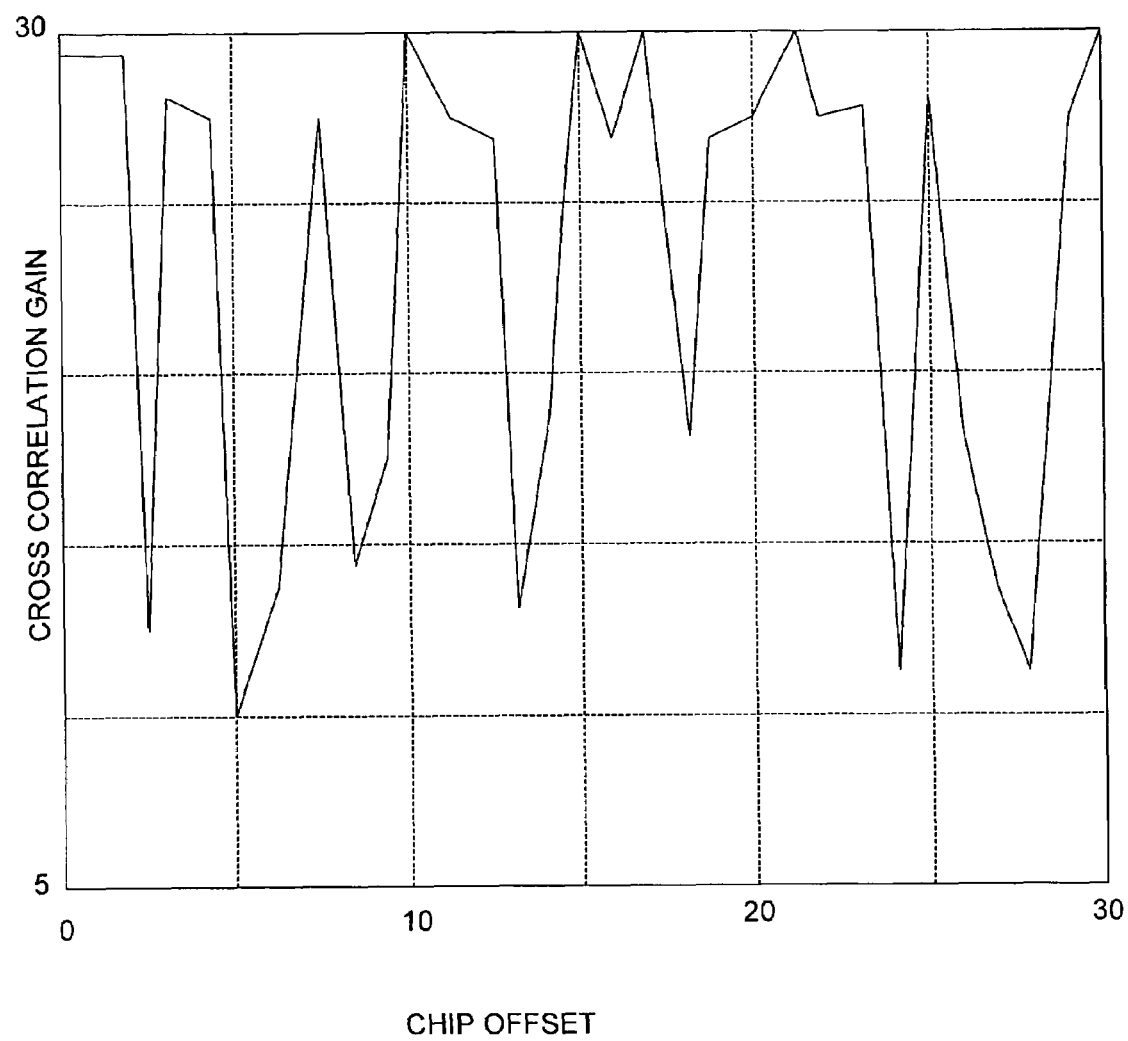
FIG. 10 is a plot that depicts that quality of transmission of coded symbols.

FIG. 10 is a plot that depicts that quality of transmission of coded symbols for the device 1 and device 2 having their transmitted signals coded with the Gold codes provided. As shown in FIG. 10, the cross-correlation gain of the received coded signals varies from 10 to 30 dB for various units of multi-carrier symbols. Plot provides cross correlation versus units of multi-carrier symbols (units of time).

If the fractional symbol offset between the desired symbols and the interfering symbols is zero, that is, the symbols are not aligned, then the cross-correlation gain shown in FIG. 10 is only an upper bound of the possible cross-correlation gain. That is, the cross-correlation gain is probably worse than shown in FIG. 10. The actual cross-correlation gain is a function of both the chip offset and the fractional symbol offset between the desired symbols and the interfering symbols. Typically, a code is selected that provides the maximum average cross-correlation gain across all chip offsets, as determined through simulation and experimentation.

In situations where the chip offset can be controlled, and there is no fractional offset, Walsh codes can provide the greatest cross-correlation gain. Walsh coding can provide signals having a cross-correlation that is zero.

Determination of Chip Offset

Chip offset can be determined by detecting synchronization sequences within the first multi-carrier symbols within received packets. That is, the starting points of the packets can be sensed. This information allows the determination of chip offsets.

The receiving device receives multi-carrier symbols, correlates the symbols with known sync sequences and compares the result with a predetermined threshold to determine the staring point of packets and specific symbol boundaries. If a sync sequence is not known, sequences can be accessed from a library of sequences known to be used within the system.

Adjustment of Chip Offset

Knowing the chip offset is valuable because it allows for selection of optimal codes as provided by chip offset versus code simulations. However, some transmitters allow for adjustment of the transmission timing of symbols. If, for example, a Walsh-type code is used to code the multi-carrier symbol, adjustment of the transmission symbols, and therefore, the chip offset can be critical.

Figure 11:
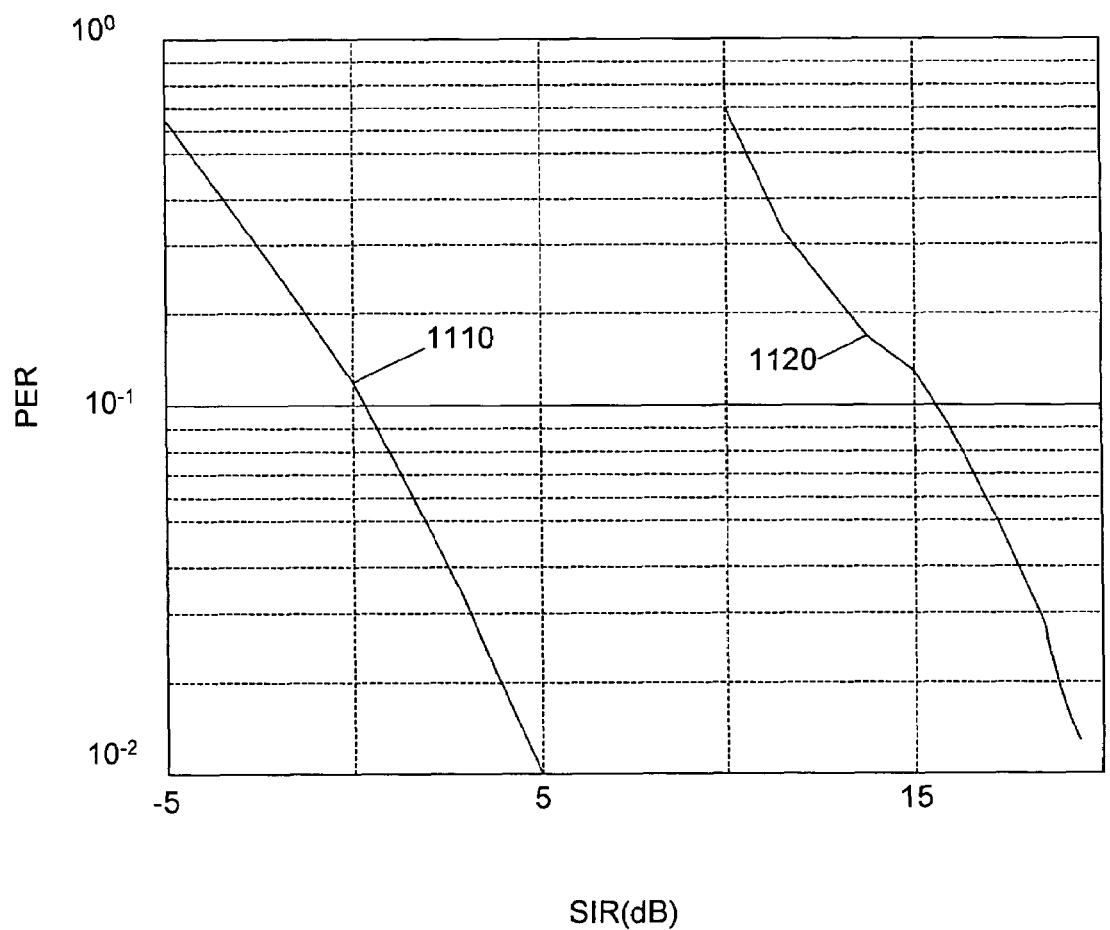
FIG. 11 is a plot that depicts the quality of transmission of coded symbols versus signal quality for non-coded symbols.

FIG. 11 is a plot that depicts the quality of transmission of coded symbols versus signal quality for non-coded symbols. The curves 1110, 1120 show the packet error rate (PER) of the received signals versus signal to interference ration (SIR) for Gold coded signals (curve 1110) and non-coded signals (curve 1120). Clearly, the Gold coded signals provide far superior PER for given levels of SIR. The code length for this plot is thirty one. The coding, as shown in the plot, provides about 15 dB of gain.

Figure 12:
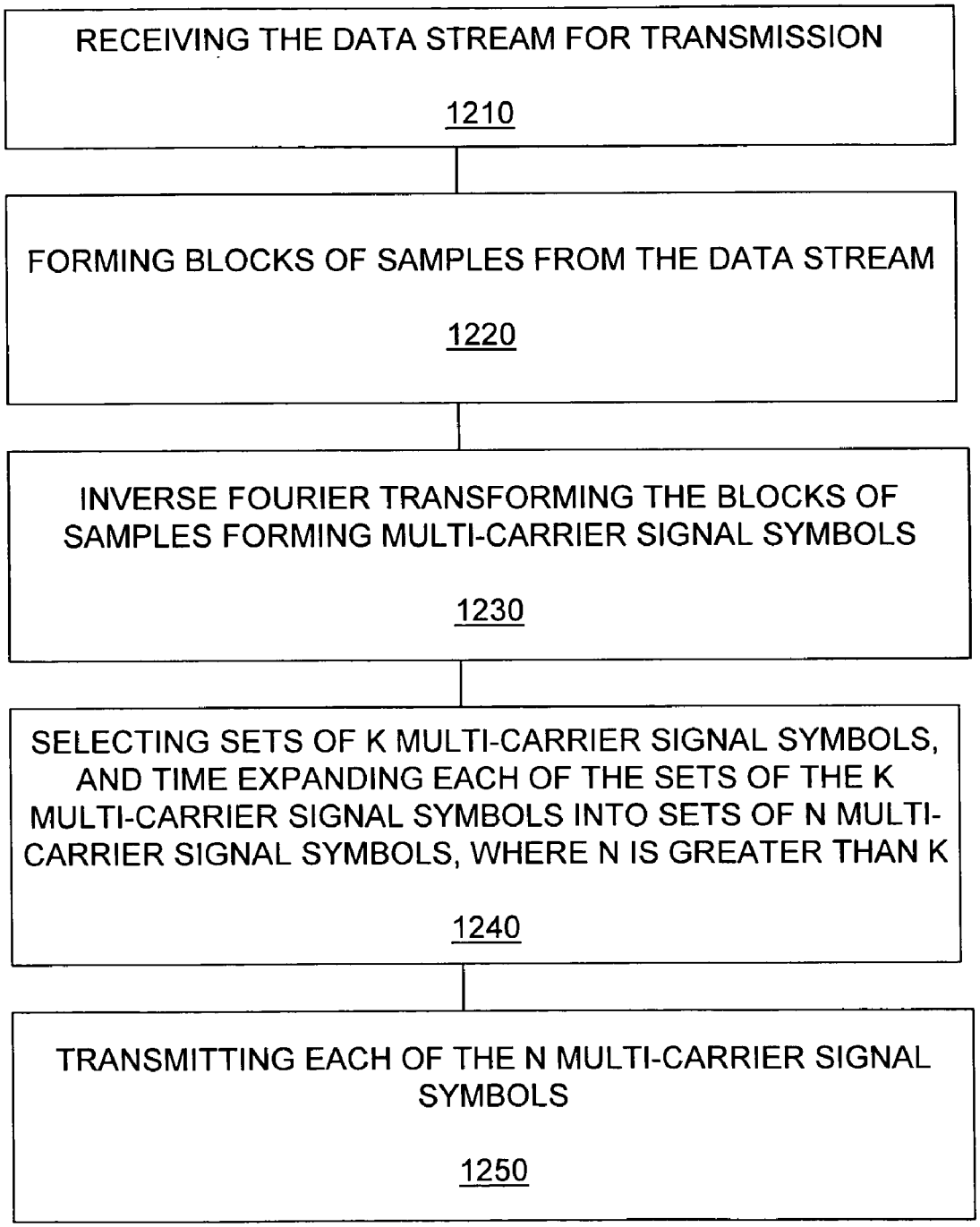
FIG. 12 is a flow chart that shows a method of transmission pre-processing.

FIG. 12 is a flow chart that shows a method of transmission pre-processing. A first step 1210 includes receiving the data stream for transmission. A second step 1220 includes forming blocks of samples from the data stream. A third step 1230 includes inverse Fourier transforming the blocks of samples forming multi-carrier signal symbols. A fourth step 1240 includes selecting sets of k multi-carrier signal symbols, and time expanding each of the sets of the k multi-carrier signal symbols into sets of n multi-carrier signal symbols, where n is greater than k. A fifth step 1250 includes transmitting each of the n multi-carrier signal symbols.

Figure 13:
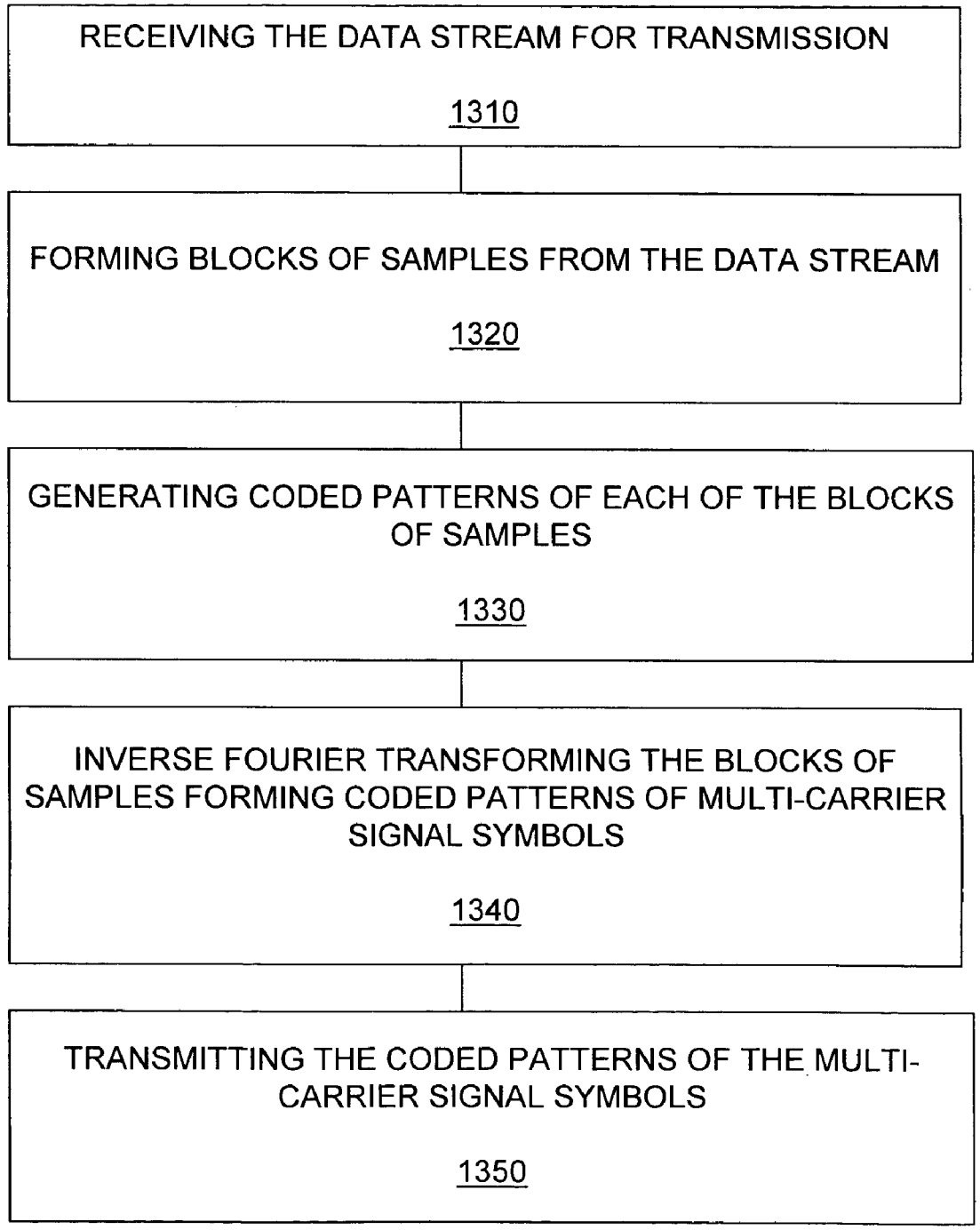
FIG. 13 is another flow chart that shows a method of transmission pre-processing.

FIG. 13 is another flow chart that shows a method of transmission pre-processing. A first step 1310 includes receiving the data stream. A second step 1320 includes forming blocks of samples from the data stream. A third step 1330 generating coded patterns of each of the blocks of samples. A fourth step 1340 includes inverse Fourier transforming the blocks of samples forming coded patterns of multi-carrier signal symbols. A fifth step 1350 includes transmitting the coded patterns of the multi-carrier signal symbols.

FIG. 14 is a flow chart that shows a method of receiving a pre-processed transmission signal. A first step 1410 includes receiving the base-band received signals. A second step 1420 includes filtering adjacent channel interference. A third step 1430 includes removing the cyclic prefix of the multi-carrier signals (note, this could alternatively be a postfix). A fourth step 1440 includes time compressing the multi-carrier signals through decoding consistent with the coding used to time spread the multi-carrier signals. A fifth step 1450 includes transforming the decoded multi-carrier back to the frequency domain. A sixth step 1460 includes converting the multi-carrier symbols into a serial data stream.

Figure 15:
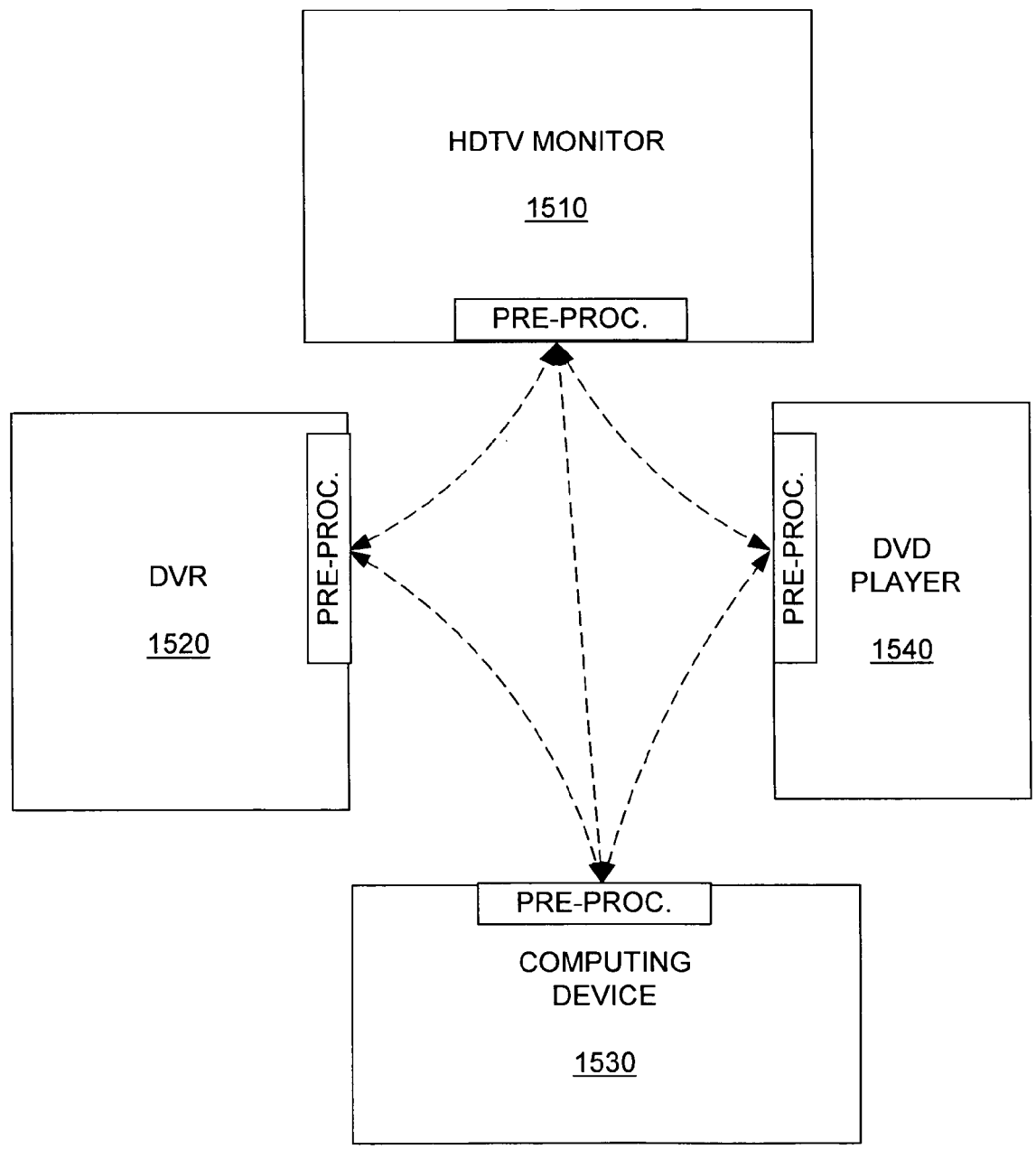
FIG. 15 shows networked components that can benefit from the use of transmission pre-processing.

FIG. 15 shows networked components that can benefit from the use of transmission pre-processing that include multi-carrier time spreading. The network can include, for example, a high definition television (HDTV) monitor 110 networked with other devices, such as, a digital video recorder (DVR) 120, a digital video disk (DVD) player 140 and a computing device 130. Each of the components 110, 120, 130, 140 include integrated circuits that provide the multi-carrier time spreading, and therefore, can pre-process transmission signals to minimize the correlation between the transmission signals.

Although specific embodiments of the invention have been described and illustrated, the invention is not to be limited to the specific forms or arrangements of parts so described and illustrated. The invention is limited only by the appended claims.

What is claimed:

1. A method of pre-processing a data stream for transmission, comprising:

receiving the data stream for transmission;

forming blocks of samples from the data stream;

inverse Fourier transforming the blocks of samples forming multi-carrier signal symbols; and selecting sets of k multi-carrier signal symbols, and time expanding each of the sets of the k multi-carrier signal symbols into sets of n multi-carrier signal symbols, where n is greater than k; wherein time expanding comprises selecting coding of the sets of the k multi-carrier signal symbols based upon a chip offset and a fractional symbol offset of a desired symbol and an interfering symbol.

2. The method of pre-processing a data stream of claim 1, transmitting each of the n multi-carrier signal symbols.

3. The method of pre-processing a data stream of claim 1, wherein the multi-carrier signal symbols include OFDM symbols.

4. The method of pre-processing a data stream of claim 1, wherein k=1.

5. The method of pre-processing a data stream of claim 1, further comprising frequency expanding the multi-carrier signal symbols.

6. The method of pre-processing a data stream of claim 5, wherein the frequency expansion expands the multi-carrier symbols into more than one designated frequency band, and different frequency bands are transmitted at different times.

7. The method of pre-processing a data stream of claim 5, wherein frequency expanding the multi-carrier signal symbols comprises coding the multi-carrier signal symbols, thereby increasing a bit length of the multi-carrier signal symbols.

8. The method of pre-processing a data stream of claim 1, further comprising space expanding the multi-carrier signal symbols.

9. The method of pre-processing a data stream of claim 8, wherein space expanding comprises space coding the multi-carrier signal symbols for transmission through spatially separate antennas.

10. The method of pre-processing a data stream of claim 5, further comprising space expanding the multi-carrier signal symbols.

11. The method of pre-processing a data stream of claim 10, wherein space expanding comprises space coding the multi-carrier signal symbols for transmission through spatially separate antennas.

12. The method of pre-processing a data stream of claim 1 wherein coding the sets of k multi-carrier symbols includes a set of 1 and −1 multipliers of each of the multi-carrier signal symbols, forming n coded multi-carrier signal symbols for each of the sets of k multi-carrier signal symbols.

13. The method of pre-processing a data stream of claim 1, wherein the time expanding of each of the sets of the k multi-carrier signal symbols is dependent upon a required transmission data rate.

14. The method of pre-processing a data stream of claim 1, further comprising:
determining a level of synchronization between a transmitter of the sets of n multi-carrier signal symbols and a receiver of the sets of n multi-carrier signal symbols, and setting the time expanding to a desired code.

15. The method of pre-processing a data stream of claim 1, wherein the selected coding comprises a Gold code.

16. The method of pre-processing a data stream of claim 1, further comprising:
selecting the coding to minimize cross-correlation with interfering transmitters, wherein the interfering transmitters include coding of multi-carrier signal symbols according to a different code.

17. The method of pre-processing a data stream of claim 16, wherein the selected coding comprises a Gold code.

18. The method of pre-processing a data stream of claim 16, wherein code of interfering transmitters is deduced by comparing received symbols with known training sequences.

19. The method of pre-processing a data stream of claim 1, further comprising:
selecting a length of coding to minimize cross-correlation with interfering transmitters.

20. The method of pre-processing a data stream of claim 19, wherein the selection of the length is based upon a set of available lengths.

21. The method of pre-processing a data stream of claim 14, wherein the selected code comprises a Walsh code if the transmitter and the receiver are synchronized.

22. The method of pre-processing a data stream of claim 1, wherein the chip offset between transmitter and the receiver is adjusted to optimize cross-correlation gain.

23. A method of pre-processing a data stream for transmission, comprising:
receiving the data stream;
forming blocks of samples from the data stream;
generating coded patterns of each of the blocks of samples; and
inverse Fourier transforming the blocks of samples forming coded patterns of multi-carrier signal symbols; wherein
the coded patterns of multi-carrier signal symbols are based upon a chip offset and a fractional symbol offset of a desired symbol and an interfering symbol.

24. The method of pre-processing a data stream of claim 23, wherein the multi-carrier signal symbols include OFDM symbols.

25. The method of pre-processing a data stream of claim 23, further comprising frequency expanding the multi-carrier signal symbols.

26. The method of pre-processing a data stream of claim 25, wherein frequency expanding the multi-carrier signal symbols comprises coding the multi-carrier signal symbols, thereby increasing a bit length of the multi-carrier signal symbols.

27. The method of pre-processing a data stream of claim 23, further comprising space expanding the multi-carrier signal symbols.

28. The method of pre-processing a data stream of claim 27, wherein space expanding comprises space coding the multi-carrier signal symbols for transmission through spatially separate antennas.

29. The method of pre-processing a data stream of claim 23, further comprising:
determining a level of synchronization between a transmitter of the sets of n multi-carrier signal symbols and a receiver of the sets of n multi-carrier signal symbols, and setting the time expanding to a desired code.

30. The method of pre-processing a data stream of claim 23, further comprising:
selecting the coding to minimize cross-correlation with interfering transmitters, wherein the interfering transmitters include coding of multi-carrier signal symbols according to a different code.

31. A wideband, low-power transmission system comprising:
a transmitter comprising;
means for receiving the data stream for transmission;
means for forming blocks of samples from the data stream;
means for inverse Fourier transforming the blocks of samples forming multi-carrier signal symbols;
means for selecting sets of k multi-carrier signal symbols, and time expanding each of the sets of the k multi-carrier signal symbols into sets of n multi-carrier signal symbols, where n is greater than k; wherein time expanding comprises selecting coding of the sets of the k multi-carrier signal symbols based upon a chip offset and a fractional symbol offset of a desired symbol and an interfering symbol;
means for transmitting each of the n multi-carrier signal symbols;
a receiver comprising;
means for receiving the n multi-carrier signal symbols;
means for time compressing n sets received multi-carrier signal symbols to k multi-carrier symbols;
means for Fourier transforming the multi-carrier symbols forming blocks of samples; and
means for forming a data stream from the blocks of samples.

32. A networked of electronic multi-media components, wherein each of the electronic components comprises a transmitter, each transmitter comprising:
means for receiving the data stream for transmission;
means for forming blocks of samples from the data stream;

means for inverse Fourier transforming the blocks of samples forming multi-carrier signal symbols;

means for selecting sets of k multi-carrier signal symbols, and time expanding each of the sets of the k multi-carrier signal symbols into sets of n multi-carrier signal symbols, where n is greater than k; wherein time expanding comprises selecting coding of the sets of the k multi-carrier signal symbols based upon a chip offset and a fractional symbol offset of a desired symbol and an interfering symbol;

means for transmitting each of the n multi-carrier signal symbol.

33. The method of claim 1, further comprising adaptively selecting coding of the sets of the k multi-carrier signal symbols based upon a chip offset and a fractional symbol offset of a desired symbol and an interfering symbol.

34. The method of claim 1, wherein selecting the coding is additionally based on coding used by interfering transmitters.

35. The method of claim 1, further comprising detecting the chip offset, comprising detecting synchronization sequences within first multi-carrier symbols with in received packets.

36. The method of claim 1, further comprising controlling chip offset, comprising adjusting timing of transmission symbols.

* * * * *

UNITED STATES PATENT AND TRADEMARK OFFICE
CERTIFICATE OF CORRECTION

PATENT NO. : 7,430,163 B2 Page 1 of 1
APPLICATION NO. : 10/893810
DATED : September 30, 2008
INVENTOR(S) : Sujai Chari and Raveev Krishnamoorthy It is certified that error appears in the above-identified patent and that said Letters Patent is hereby corrected as shown below:

On the title page item (75), second inventor is Raveev Krishnamoorthy.

Signed and Sealed this

Third Day of March, 2009

JOHN DOLL
*Acting Director of the United States Patent and Trademark Office*